April 9, 1963

E. D. RAPISARDA

3,084,832

LIQUID DISPENSING UNIT WITH ADDITIVE
MEANS FOR A SECOND LIQUID

Filed Sept. 6, 1960

INVENTOR.
Edward D. Rapisarda
BY Chapin & Neal
Attorneys

INVENTOR.
Edward D. Rapisarda
BY Chapin & Neal
Attorneys

INVENTOR.
Edward D. Rapisarda
BY Chapin & Neal
Attorneys

April 9, 1963

E. D. RAPISARDA 3,084,832

LIQUID DISPENSING UNIT WITH ADDITIVE
MEANS FOR A SECOND LIQUID

Filed Sept. 6, 1960

INVENTOR.
Edward D. Rapisarda
BY Chapin & Neal
Attorneys

United States Patent Office 3,084,832
Patented Apr. 9, 1963

3,084,832
LIQUID DISPENSING UNIT WITH ADDITIVE MEANS FOR A SECOND LIQUID
Edward D. Rapisarda, West Springfield, Mass., assignor to Gilbert & Barker Manufacturing Company, West Springfield, Mass., a corporation of Massachusetts
Filed Sept. 6, 1960, Ser. No. 54,227
18 Claims. (Cl. 222—28)

The present invention relates to improvements in liquid dispensing units which are capable of simultaneously delivering both a first or "base" liquid and a predetermined proportion of a second or "additive" liquid.

For convenience in terms of reference, the "base" liquid referred to will be gasoline and the "additive" liquid will be oil. This is not, however, to be taken as a limitation on the use of the dispensing unit hereinafter described and claimed.

The object of the invention is to provide a simple and practical fuel dispensing unit which will satisfy the requirements of power boat operators, particularly as they are serviced at yacht clubs, marinas and the like.

More broadly speaking, the object of the invention is to provide a simple, improved dispensing unit capable of simultaneously dispensing gasoline and a fixed blend of oil.

Another object of the invention is to provide an improved dispensing unit capable of selectively dispensing gasoline alone or gasoline having mixed therewith a predetermined percentage of oil additive.

A further object of the invention is to attain the above ends in a fashion satisfying local authorities, such as a sealer of weights and measures, that accurate quantities of both gasoline and oil are being delivered.

Yet another object of the invention is to provide selector means for changing the amount of oil being delivered and simultaneously conforming price indicating means to reflect the amount or cost of the oil delivered.

The dispensing unit of the present invention is characterized in its simplicity by the fact that pre-existing frame structure may be used with little or no modification and further by the use of essentially the same components for handling the gasoline as have been hitherto employed. The same motor that is used to drive the gasoline pump may advantageously be used to power an oil pump which draws oil from a supply tank and delivers it into a sump. From the sump, oil flows by gravity feed to the suction side of a pair of metering pumps each of which is directly coupled to the gasoline meter. The oil metering pumps preferably have different capacities so that the oil passing through each may be selectively fed into the gasoline delivery line in order to obtain a desired percentage of oil in the gasoline. To accomplish this end each oil meter is provided with a valve at its discharge side which can be operated to bypass the oil back to the suction side of the metering pump or direct it into a line leading to the delivery hose. Means are provided so that the output of each oil pump may be separately diverted into a measuring container for calibration purposes. The oil meters are adjustable in the sense that their capacities may be varied and thus calibrated to deliver an accurate percentage of oil relative to the amount of gasoline delivered. Once calibrated the oil meters may be sealed to protect the puchasing public.

Preferably the means for selecting the metering pump from which oil is to be delivered will also render visually operative a set of register wheels showing the cost of oil delivered, based on a given unit price. It is also preferable to have two sets of register wheels both of which reflect, at all times, the cost of oil passing through each of the respective oil metering pumps even though oil flows from only one pump (or neither pump) into the gasoline line. A shutter covers one set of oil wheels and exposes the set of wheels reflecting the cost of oil actually being delivered by the operative oil meter to the gasoline line. When both oil meters are inoperative and only gasoline is being delivered, then both sets of oil register wheels are covered by the shutter. A single operating knob is provided to select the oil meter which will be operative and to move the slide relative to the oil register wheels as described.

The above and other related objects and features of the invention will be apparent from a reading of the following description of the disclosure found in the accompanying drawings and the novelty thereof pointed out in the appended claims.

Figure 2:
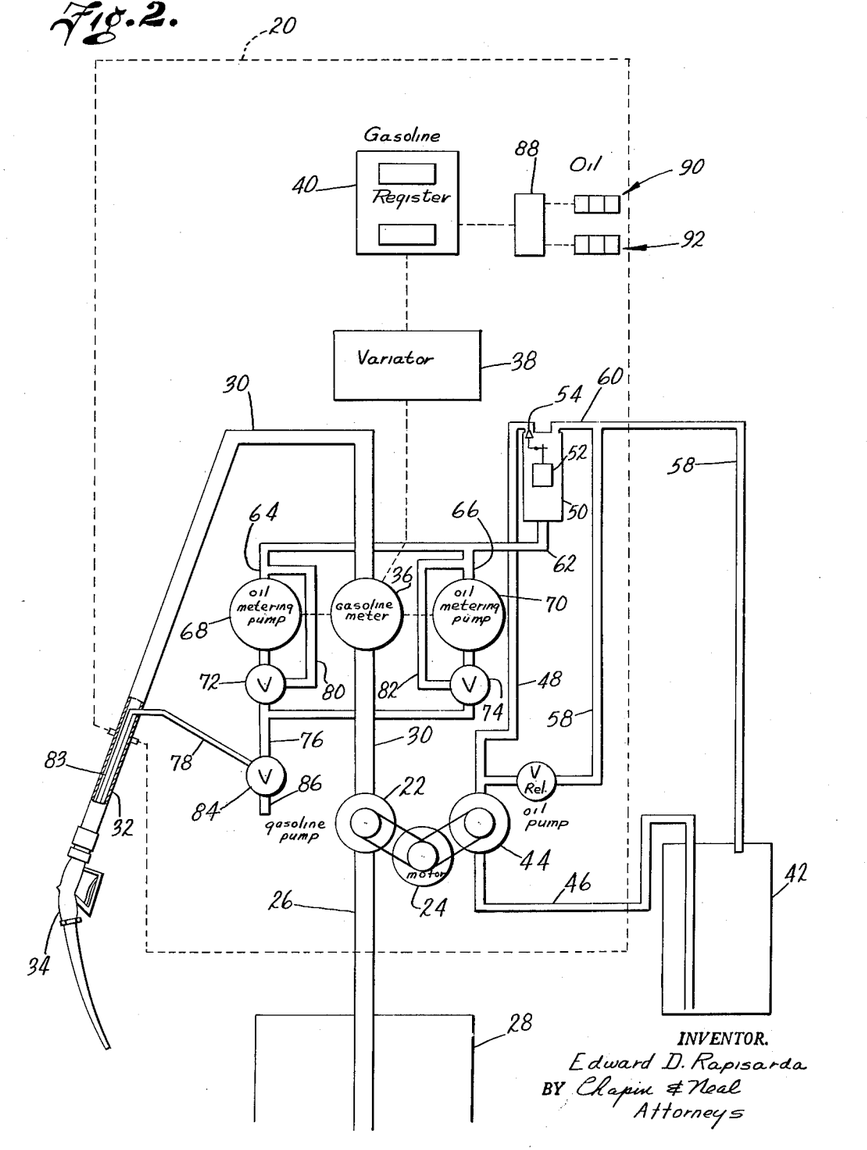
FIG. 2 is a flow diagram, schematically showing the flow of gasoline and oil additive.

The overall organization of the present gasoline-oil dispensing unit may best be understood by first referring to the diagrammatical showing of FIG. 2 in the drawings. The present dispensing unit comprises a casing, indicated by the dash line 20, in which are mounted the essential components of a conventional gasoline dispensing unit. Thus a centrifugal pump 22 is driven by motor 24 with a pipe 26 extending from the suction side of the pump 22 to a gasoline tank 28 which, in usual practice, would be buried beneath the ground. As herein used the terms pipe or line denote any conduit, integrally or compositely formed, for conveying liquid in the manner indicated. Gasoline is discharged from the pump 22 through line 30 and flexible hose 32 to a dispensing nozzle 34. A positive displacement meter 36 measures the amount of gasoline flowing therethrough and discharged from the nozzle 34. Although not shown in FIG. 2, it is contemplated that the usual air separator would be employed to remove air from the gasoline before delivery.

A mechanical connection is made from the meter 36 to a variator 38 and then a mechanical connection is made between the variator 38 and a register 40 which is provided to indicate, on appropriate register wheels, the volume of gasoline dispensed and its cost based on a unit price established by the variator 38. The variator 38 and register 40 may both be of known construction and will not be discussed in any further detail.

Switch means are provided, as will be later explained in greater detail, for actuating the motor 24 and the pump 22 to pressurize gasoline in the passageway means extending from the tank 28 to the nozzle 34, so that control of the usual valve in the nozzle 34 will permit gasoline to be dispensed as desired. In one condition of the present dispensing unit gasoline alone will be dispensed employing the components just described, as in a conventional gasoline dispensing unit.

It will next be seen that passageway means also extend from a tank or container 42, for a supply of oil, to the hose 32 for delivery of the oil from the nozzle 34. More specifically, the suction side of an oil pump 44, also driven by motor 42, is connected by line 46 to the supply of oil in the tank 42. The discharge side of the pump 44 is connected by a line 48 to a sump 50. A float 52 mounted in the sump 50 is arranged, by means of a valve 54, to shut off the flow of oil through the pipe 48 into the sump 50 when the float 52 reaches a predetermined level. The effect of which is to limit the pressure of the oil in the sump 50 to a level no more than slightly above atmospheric pressure. In this connection it will be seen that the discharge side of the pump 44 is connected through a pressure relief valve 56 and line 58 back to the oil supply tank 42. It will also be seen that the top of the sump 50 is connected by a short line 60 to the line 58 to prevent any build up of pressure in the sump 50.

The bottom of the sump 50 is connected by a line 62 and branches 64, 66 to metering pumps 68 and 70. The pumps 68 and 70 are preferably double acting piston pumps, each having a different capacity, and each drivingly connected to the gasoline meter 36. The discharge side of each of the pumps 68 and 70 is connected to bypass valves 72, 74 respectively. In one position of each of the bypass valves 72, 74 oil will flow towards the hose 32 through the pipes 76 and 78. In the other positions of the valves 72 and 74 the oil will be diverted through bypass passageways 80, 82 respectively back to the suction sides of the pumps 68 and 70 respectively. Means, later to be described, are provided for selectively operating the valve 72 and 74 so as to introduce a desired additive amount of oil to the gasoline.

Preferably the pumps 68 and 70 have, as indicated, different capacities and the valves 72 and 74 are alternately operated to divert oil through the bypass passageways 80 and 82. Thus in one condition of the dispensing unit the valve 74 will be in its diverting position while the valve 72 is in its first or operative position so that oil will flow from the metering pump 68 through the valve 72 and into the hose 32 to be dispensed from the nozzle 34. In another condition of the dispensing unit the valve 72 will be in its divert position and the valve 74 will be set to pass oil from the metering pump 70 to the hose 32. In a further condition of the dispensing unit both of the valves 72 and 74 will be in their divert positions so that gasoline alone may be dispensed from the nozzle 34.

It will be seen that the line 78 joins a flexible hose 83 which extends within the hose 32 and terminates adjacent the nozzle 34. In this way a very minimum of what had been mixed for a previous delivery is carried over into a subsequent delivery.

Reference is made to valve 84 connecting the lines 76 and 78. The purpose of this valve is to enable accurate calibration of the metering pumps 68 and 70, as will be later described. The function of the valve 84 is to permit flow of oil from the metering pumps 68 and 70 to be separately diverted into a calibrating container. Thus with the valve 74 in its divert position and valve 72 in its operative position oil from the metering pump 68 will pass through the valve 84 in its calibrating position and be discharged from a spout 86 to be collected in a calibrating container. Similarly, with the valve 72 in its divert position and the valve 74 in its operative position oil will pass from pump 70 through the spout 86 and can be collected in a calibrating container.

It will also be noted that a mechanical connection is made from the register 40 to a chain of gears 88 and then mechanical connections are made to two sets of register wheels 90 and 92 respectively. The gearing 88 is predetermined so that the register wheels 90 will reflect the cost of oil added by the metering pump 68 while the register wheels 92 will reflect the cost of oil passing through the metering pump 70. The sets of register wheels 90 and 92 will both rotate whenever gasoline is being delivered. Means are provided and hereinafter described for rendering visible the set of oil register wheels corresponding to the metering pump 68 or 70 which is in its operative position. This set of register wheels will show to a customer the cost of oil actually passing into the hose 32. When gasoline alone is being delivered means are provided for covering over and concealing from sight both sets of register wheels 90 and 92.

Figure 1:
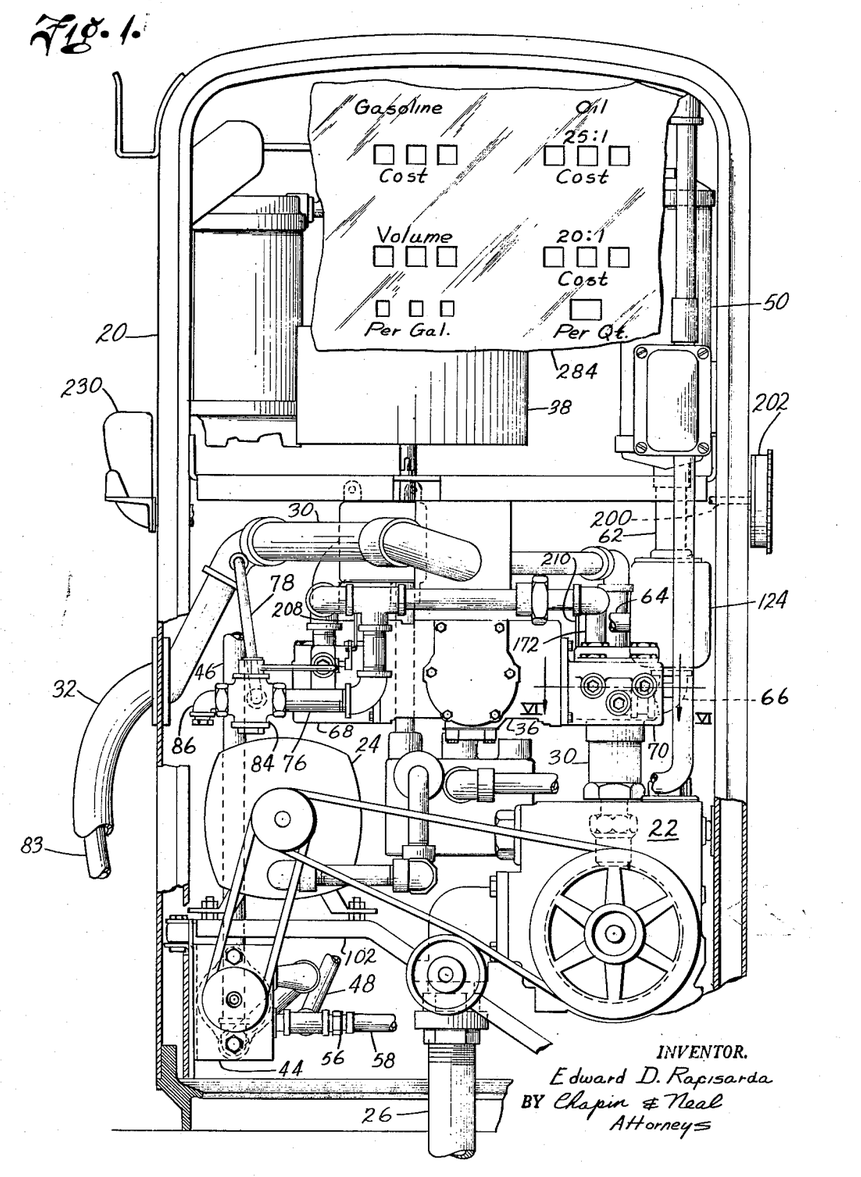
FIG. 1 is an elevation of a gasoline dispensing unit embodying the present invention, the panel covers having been removed.

By referring to FIG. 1, the physical arrangement of the various elements within the casing 20 may be seen. The motor 24 and gasoline pump 22 are mounted on the frame member 102 with the oil pump 44 mounted thereunderneath. The gasoline intake line 26 extends through the bottom of the casing, while the line 30 connects the discharge of gasoline from the pump 20 to the meter 36. A continuation of the line 30 carries the gasoline to the flexible hose 32. The oil inlet line 46 extends to the source of oil which may advantageously take the form of a large drum strapped to the rear of the dispensing unit.

Figures 3, 4, 5:
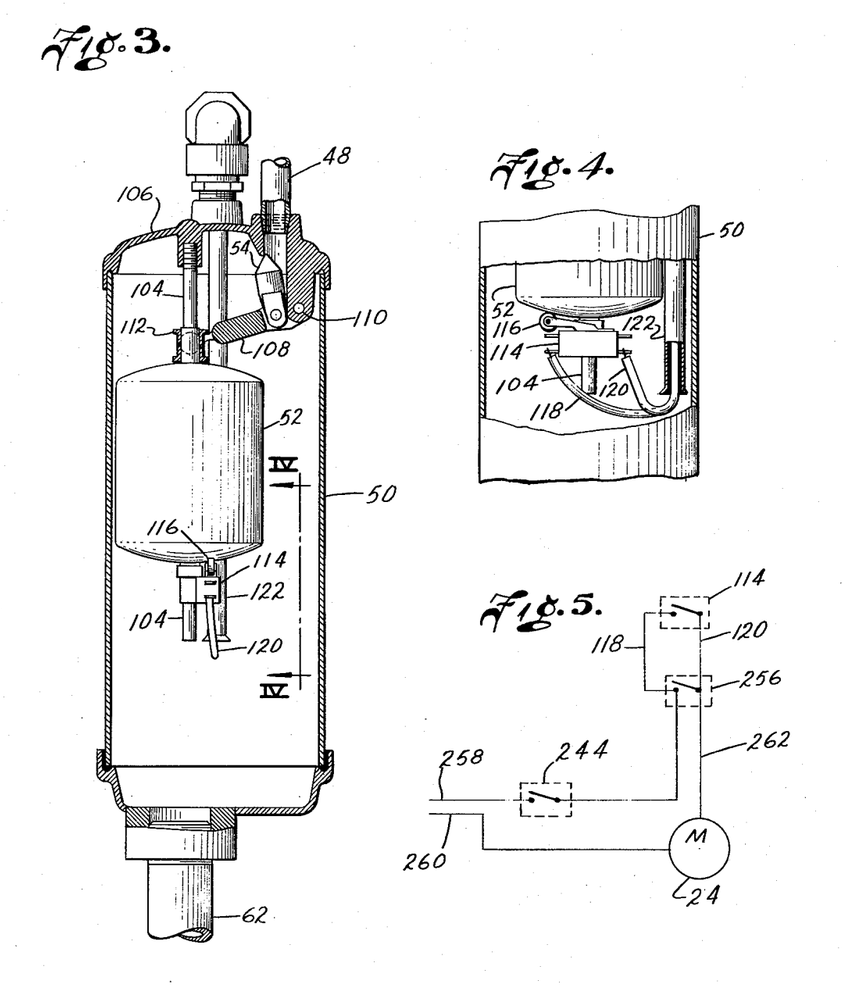
FIG. 3 is a detailed showing, in section, of a gravity oil sump seen in FIGS. 1 and 2.
FIG. 4 is a section taken substantially on line IV—IV in FIG. 3.
FIG. 5 is a simplified electrical diagram.

Oil discharged from the pump 44 is carried through the line 48 to the top of the sump 50 which, by reference to FIGS. 3 and 4, will now be described in detail. The float 52 is slidably mounted on a rod 104 suspended from the top cap 106 of the sump 50. Also formed in the top cap 106 is a seat for the valve 54 immediately beneath the connection of the line 48 thereto. The valve 54 is pivotally connected to a lever 108, one end of which is pivotally connected at 110 to the top cap 106. The other end of the lever 108 is bifurcated and straddles a collar 112 secured to the upper end of the float 52. It will be apparent with this arrangement that as the level of oil in the sump 50 rises, the float 52 will be raised and the valve 54 will close the seat on the top cap 106 throttling or preventing flow of oil from the pipe 48 into the sump 50. Thus, as previously explained in connection with FIG. 2, the pressure of the oil in the sump 50 never rises to any substantial degree above atmospheric pressure.

In order to detect the presence of a sufficient quantity of oil in the sump 50, there is provided a limit switch 114 (FIG. 4) which is mounted on the lower end of the rod 104. When the float 52 is raised away from the roller actuating arm 116, the contacts of switch 114 will close, thereby indicating that a sufficient quantity of oil has been fed into the sump 50 for proper operation of the dispensing unit. Wires 118 and 120 are connected to the limit switch 114 and are led through a sealed tube 122 and through the top cap 106 of the sump to an appropriate electrical conduit. The electrical circuit in which the switch 114 is incorporated is diagrammatically shown in FIG. 5 and will later be explained in detail.

The line 62 from the bottom of the sump 50 to the oil metering pumps 68 and 70 is compositely formed and comprises a manifold 124 (FIG. 1) with the line 64 leading to the suction side of the metering pump 68 and the line 66 leading to the suction side of the metering pump 70. The constructional details of the metering pumps 68 and 70 may best be appreciated by reference to FIGS. 6 and 7 wherein it will be seen that the metering pump 70 and the bypass valve 74 are contained within a common housing 130 which is secured by screws 132 to the housing of the meter 36. The pump 70 is a double-acting reciprocating piston type pump comprising a piston rod 134 which is secured to a non-calibrating, i.e. fixed stroke, piston P of the meter 36 for reciprocable movement therewith.

Figures 6, 7, 8:
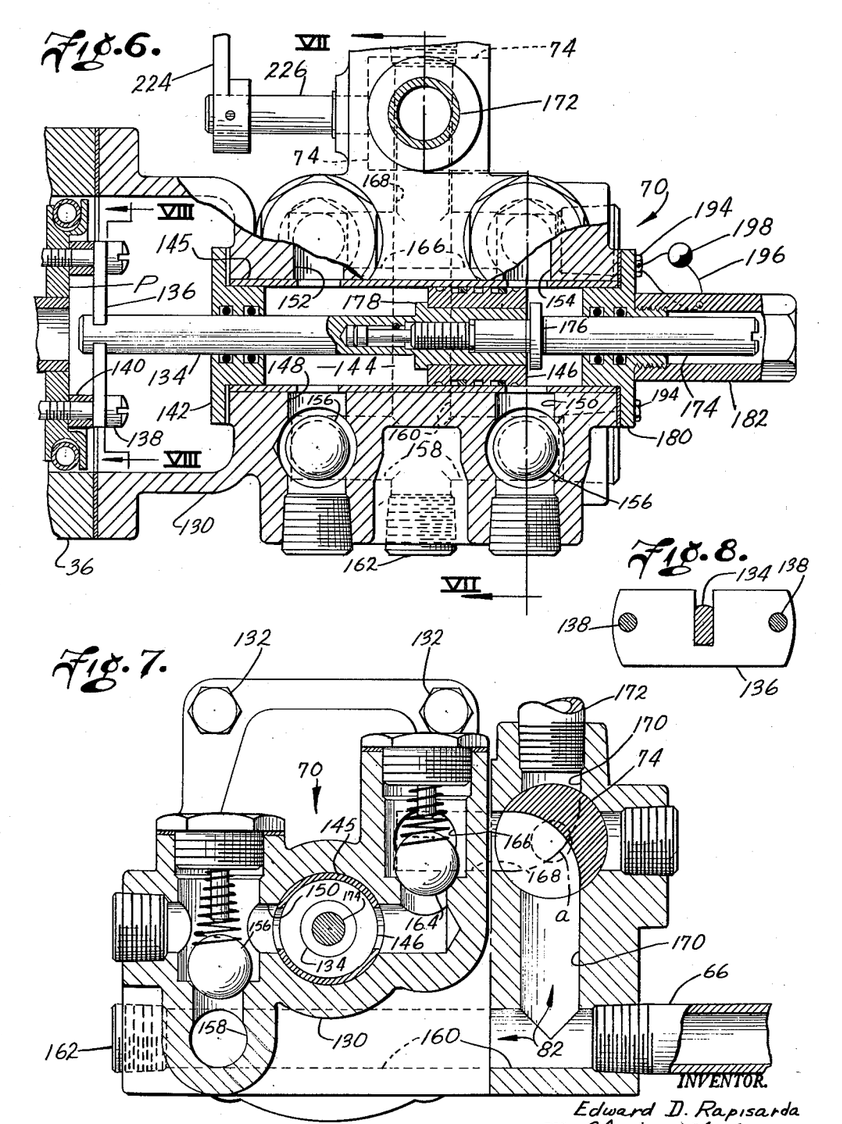
FIG. 6 is a section, on an enlarged scale, taken on line VI—VI in FIG. 1 and showing the interior details of one oil pump.
FIG. 7 is a section taken on line VII—VII in FIG. 6.
FIG. 8 is a section taken on line VIII—VIII in FIG. 6.

Referring to FIGS. 6 and 8, it will be seen that a slotted plate 136 is secured to the outer end of the piston P by screws 138 and spaced therefrom by collars 140. The piston rod 134 is notched to fit the slot in the plate 136, thereby capturing the rod 134 and yet permitting its removal in a relatively easy fashion. The piston rod passes through an appropriate packing member 142 and enters a cylinder 144 formed by a sleeve 145. A piston 146 is slidably mounted on an enlarged end portion of the piston rod 134. As would be the case in a double-acting piston, there are two intake ports 148, 150 and two discharge ports 152, 154. The entrances to the intake ports 148 and 150 are controlled by appropriate one-way check valves 156 and are connected to a common passageway 158. A central passageway 160 intersects the common passageway 158 and extends from front to rear of the housing 130. One end of the passageway 160 is closed off by a plug 162 while the line 66 bringing oil from the sump 50 is threaded into the other end of the passageway 160. Thus oil will flow substantially at gravity pressure to the suction or intake side of the pump 70. Oil will be discharged alternately through the discharge ports 152, 154 of the pump 70 which are controlled by appropriate check valves 164 and are connected by a common passageway 166 which is intersected by a central passageway 168 which in turn intersects a vertical passageway 170. A discharge pipe or line 172 (forming a part of the discharge passageway 76 in FIG. 2) is threaded into the upper end of the passageway 170. The divert valve 74 is disposed in the passageway 168 to control flow of oil discharged from the pump 70. In the illustrated position of the valve 74 the oil discharged from the pump 70 will pass through the passageway 170, back to the suction side of the pump 70, as it is discharged into the passageway 160. (The passageways 160 and 170 combine to form the return passageway 82 referred to in FIG. 2.) In the alternate or operative position of the valve 74, as indicated by the phantom line a in FIG. 7, oil will be discharged from the pump 70 upwardly through the pipe 172 and flow towards the gasoline hose 32 (FIG. 2) and be discharged from the nozzle 34.

Several of the passageways above described are blocked at their ends by plugs, not specifically referred to, for controlling flow of oil in the manner set forth, as is evident from FIGS. 6 and 7.

The oil metering pump 68 is essentially identical in all respects to the oil metering pump 70 just described. The pump 68 comprises the bypass valve 72 which is movable between a bypass position in which the oil discharged from the pump 68 is diverted back towards the suction side thereof, and a second or operative position in which the oil is discharged therefrom through the passageway 76 (FIG. 2) towards the discharge nozzle 34.

The metering pumps 68 and 70 preferably have different capacities as may be simply provided for by using a different inner diameter liner 145 (FIG. 6) to form the cylinder 144. In the preferred mode of operation of the present dispensing unit it is desired that the metering pumps 68 and 70 have different and accurately controlled flow rates relative to the flow of gasoline through the meter 36. In this connection attention is directed to the calibrating means for the pump 70 as seen in FIG. 6. An extension 174 is threaded into the outer end of the piston rod 134 and is provided with a shoulder 176 which captures the piston 146 between a shoulder 178 formed on the piston rod 134. The spacing between the shoulders 176 and 178 may be adjusted to vary the effective stroke of the piston 146 and the capacity of the pump 70.

To this end the extension 174 passes beyond the cylinder 144 through a packing member 180 and is provided with a screwdriver slot in its outer end for making the described adjustment. Friction means, not shown, are provided to hold the extension 174 in any adjusted position so as to accurately maintain the capacity of the pump 70 in fixed proportional relation to the volume of gasoline passing through the meter 36.

A cap 182 is threaded onto the packing member 180 to prevent free access to the extension 174. The packing member 180 is secured to the housing 130 of pump 70 by screws 194. One of the screws 194 is provided with a hole through which is passed a wire 196. Wire 196 also passes through a hole in the cap 182 and the ends of the wires 196 are joined by a lead seal 198 which will be suitably impressed by a local authority such as a sealer in weights and measures. In this manner the purchasing public may be protected in relying upon the percentage of oil which is to be added by each of the pumps 68 and 70 relative to the amount of gasoline being dispensed.

The valve 84 (FIGS. 1 and 2) as above indicated is provided to enable calibration of each of the metering pumps 68 and 70. In its calibrating position flow of oil through the line 76 is diverted through the spout 86 so that the oil may be directed into a measuring container. In order to calibrate the pumps 68 and 70 the valve 84 is first placed in its calibrating position. The valve 74 is placed in its divert position while the valve 72 is closed in its operative position. The dispensing unit is then operated with gasoline being dispensed from the nozzle 34 and oil discharged from the spout 86. Gasoline dispensed from the nozzle 34 can be directed into a measuring container which will under normal conditions be considerably larger than the measuring container for receiving the oil. One of the preferred ratios of the present dispensing unit is 25:1 or 6¼ gallons of gasoline to one quart of oil. Thus, a large graduated container can be used to measure the gasoline while a one quart container can be used to measure the oil. Having calibrated the metering pump 68 by adjustment of its piston rod extension, the end cap therefor may be sealed by a wire and lead seal, as above described. Thereafter the same procedure may be employed to calibrate the metering pump 70 with the valves 72 and 74, of course, being reversed so that the valve 72 is in its bypass position and the valve 74 is in its operative position. Another preferred ratio, for which the pump 70 is set, is 20:1 or five gallons of gasoline for each quart of oil.

Once the metering pumps 68 and 70 are calibrated, the valve 84 is turned to its normal position wherein oil from either of the pumps 68 and 70 will flow through the line 78 and hose 83 into the hose 32. The inner flexible hose 83 preferably terminates just adjacent the nozzle 34 and is provided with a spring loaded check valve (not shown) to prevent oil from draining into or being drawn into the gasoline line by any aspirator action.

Next to be described are the control means for selectively operating the bypass valve 72 and 74 in order to obtain the desired additive amount of oil which is to be dispensed with the gasoline. In this connection reference is next made to FIGS. 9, 10 and 11. A horizontally disposed shaft 200 spans the greater width of the dispensing unit and is journaled at its right-hand end on the frame member 20. A selective knob 202 is secured to this end of the shaft. The opposite end of the shaft 200 is journaled in a bracket 204 secured to the underside of a fixed shelf 206. Linkage mechanism comprising links 208 and 210 connect the shaft 200 with the bypass valves 72 and 74 respectively. More particularly each linkage mechanism comprises an L-shaped lever 212 (FIGS. 9, 11 and also 12) brazed to a collar 214 which is fast upon the shaft 200 and also brazed to a washer 216. Rotatably mounted on the shaft 200 is a collar 218 having an arm 220 brazed thereto and projecting into obstructive relation with the lever 212. A snap ring 222 maintains the collar 218 in contiguous relation with the washer 216. A spring loaded ball detent arrangement, seen in FIG. 9, normally holds the collar 218 and washer 216 in fixed angular relationship so that the lever 212 and finger 220 will rotate as a unit with the shaft 200. The link 210 (FIG. 11) is connected at its upper end to the arm 220 and at its lower end to a lever arm 224 which is secured to a rock shaft 226 projecting from and integral with the valve 74 (see also FIG. 6). It will be seen from FIGS. 11 and 12 that a leaf spring 228 is mounted on the shelf 206 and bears against the arm 220 resisting rotative movement of the arm 220 in a clockwise direction.

Figure 11:
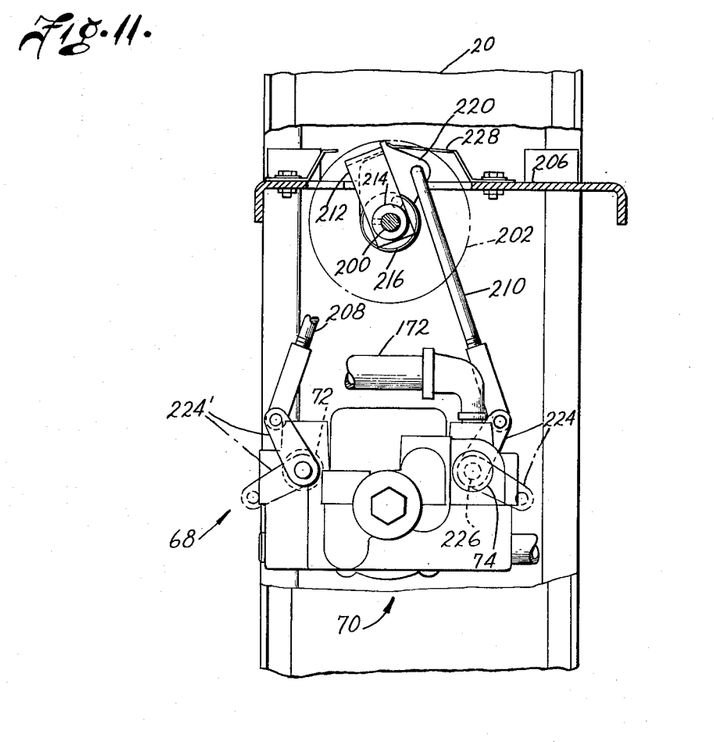
FIG. 11 is a section taken on line XI—XI in FIG. 9.
Figure 12:
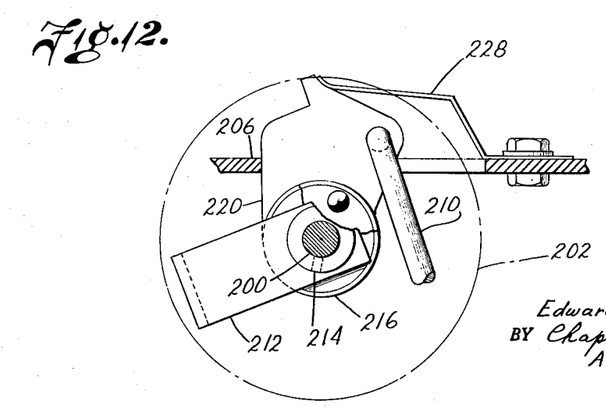
FIG. 12 is an enlarged view showing the action of linkage mechanism seen in FIG. 11.

In the illustrated position of the linkage mechanism as shown in FIG. 11, the valve 74 is in its divert or bypass position wherein oil will pass from the discharge side of the pump 70 back to the suction side thereof with no oil being forced or delivered to the dispensing nozzle 34. In FIG. 11 the bypass valve 72 is also in its divert position and oil will not be forced by the pump 68 towards the dispensing nozzle 34. Under these conditions with both the valve 72 and 74 in their divert positions the pumps 68 and 70 are effectively rendered inoperative and gasoline alone may be dispensed from the nozzle 34 simply by actuating the gasoline pump in the conventional fashion.

When it is desired to deliver from the dispensing unit a mixture of oil and gasoline, the knob 202 is twisted to rotate the shaft 200 in either direction. When the shaft 200 is rotated in a clockwise direction, the lever arm 212 will positively drive the finger 220 beneath the leaf spring 228 thereby rotating the lever arm 224 to its illustrated phantom position and moving the valve 74 to its first or operative position. When the shaft 200 is rotated in a clockwise direction the valve 72 remains in its bypass position as will be further apparent from the description hereinafter. With the valve 74 in its operative position, oil discharged from the pump 70 will pass into the pipe 172 and since there is a solid column of oil from the pump 70 to and through the hose 83 (FIG. 2) adjacent the nozzle 34, oil will be dispensed from the nozzle 34 at the same rate it is delivered by the pump 70. After dispensing a mixture of gasoline and oil, as delivered by the pump 70, the knob 202 may be again rotated to bring the shaft 200 to the position illustrated in FIG. 11.

Thereafter, if it is desired to deliver a mixture of gasoline and the additive percentage of oil delivered by the pump 68, the shaft 200 will be rotated in a counter-clockwise direction from the position seen in FIG. 11. In so doing the linkage mechanism comprising the link 208 will be moved in the proper direction to lower the lever arm 224′, connected to the valve 72, to the illustrated phantom position, thus moving the valve 72 to its first or operative position. When the shaft 200 is rotated in a counterclockwise direction from the position shown in FIG. 11, the lever 212 will rotate therewith and be angularly spaced from the arm 220 which engages a stop on the shelf 206 and cannot rotate in a counterclockwise direction past the position illustrated in FIGS. 11 and 12. The detent connection between the lever 212 and arm 220 makes possible this relative angular movement. When it is desired to return the shaft 200 from its FIG. 12 position to the position shown in FIG. 11, it has been found preferable to provide the leaf spring 228 so that the friction between the washer 216 and collar 218 will not impart rotation to the arm 220 until the lever 212 resumes its position of FIG. 11. Thereafter the positive drive connection provided by the lever 212 will override the effect of the spring 228 when it is desired to rotate the shaft 200 from its position of FIG. 11 to bring the valve 74 to its first or operative position. The linkage mechanism comprising the link 208 for operating the valve 72 is essentially the same, except for the fact that it operates in the reverse directions and while the parts thereof have not been described in detail, they have been identified in the drawing by primed reference characters. As desired suitable indicia can be provided (FIG. 9) on the outside of the casing 20 and matched against indicia on the knob 202 to indicate the three positions of the shaft 200 wherein a 25:1 or a 20:1 mixture of gasoline and oil will be delivered or gasoline alone will be delivered.

Referring back to FIGS. 9 and 10 in particuar, it will be seen that an operating lever 230 is disposed at the left-hand side of the dispensing unit adjacent the casing 20. The lever 230 is connected by linkage means including links 232 and 234 to a lever 236. The dotted connection indicated between the links 232 and 234 in FIG. 10 comprises conventional mechanism found in association with the actuating and reset means for the gasoline register and is such that the links 232 and 234 move in opposite directions. The lever arm 236 is secured to a shaft 238 which is journaled in a U-shaped strap 240 and has at its outer end a switch actuating arm 242. When the actuating lever 230 is swung in a clockwise direction (FIG. 10) the lever 236 (FIG. 9) and arm 242 are swung in a counterclockwise direction. As the arm 242 is swung in a counterclockwise direction it closes a switch 244 for actuating the motor 24, thereby pressurizing both the gasoline and oil for delivery by the dispensing unit.

Figure 9:
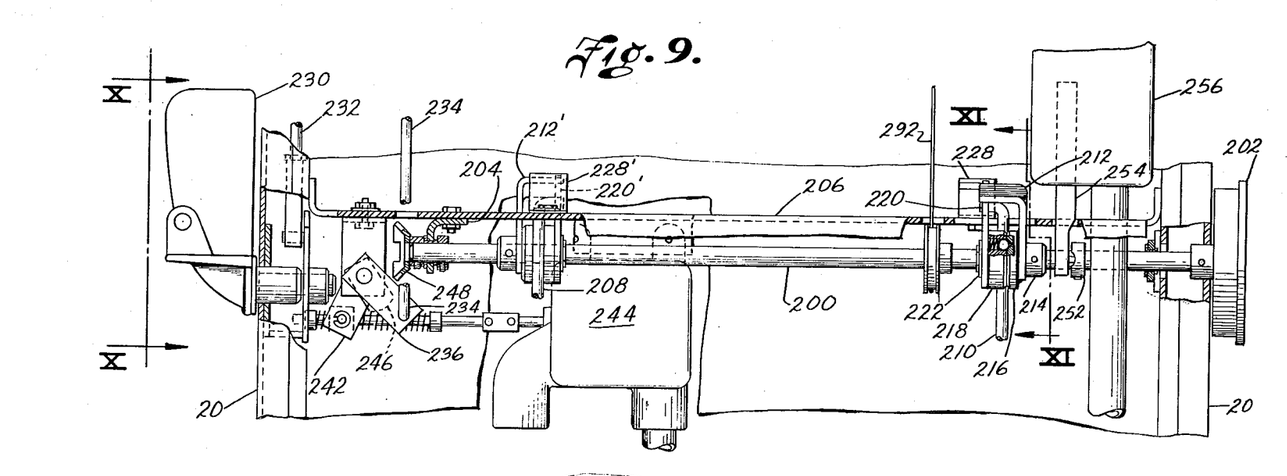
FIG. 9 is a detailed elevation, partly in section, of the selector means for establishing the proportion of oil, if any, to be delivered with the gasoline.
Figure 10:
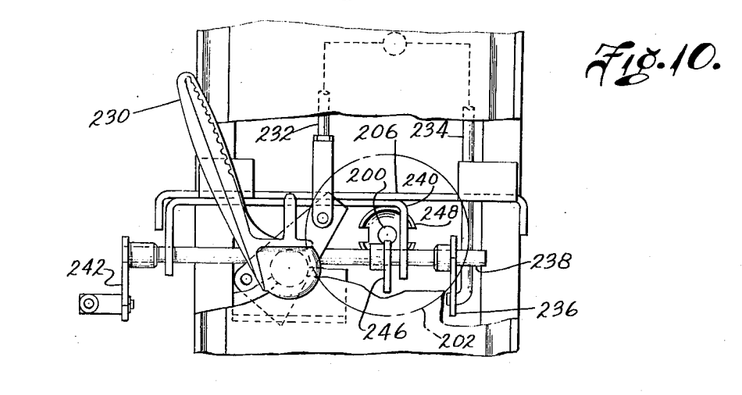
FIG. 10 is an end elevation of the selector means taken on line X—X in FIG. 9 with portions thereof broken away.

Reference is again made to the shaft 238 and a finger 246 secured thereto. The finger 246 cooperates with an interlock member 248 secured to the end of the shaft 200. The interlock member 248 is conical in shape and has three slots formed therein corresponding to the three positions of the selector knob wherein gasoline will be dispensed alone or alternately blended with oil delivered from the pump 68 or pump 70. The purpose of the interlock member 248 is to prevent a change in the position of the selector shaft 200 once a delivery has been made from the dispensing unit and also to prevent actuation of the dispensing unit itself unless the selector knob 202 is in one of the three definite positions for dispensing gasoline alone or one of the two possible blends of oil and gasoline. As illustrated in FIG. 9 the interlock and cooperative finger 246 are disposed as they would be preparatory to the delivery of gasoline alone. The interlock member 248 is positioned to receive in its middle slot the finger 246 and once the operating lever 230 is turned to its "on" position the selector shaft 200 is locked against rotation.

Reference is next made to a cam member 252 secured to the shaft 200 adjacent its right-hand end (FIG. 9). A switch arm 254 is urged by a spring (not shown) into engagement with the cam 252 and is arranged to actuate a switch 256. When the shaft 200 is in its illustrated position gasoline alone will be delivered from the nozzle 34 since both of the bypass valves 72 and 74 are in their divert positions. When the shaft 200 is rotated in either a clockwise or counterclockwise direction to dispense oil from one or the other of the pumps 68 and 70, the lever arm 254 will be displaced to open the switch 256.

The arrangement just described is provided for the purpose of preventing an attempted delivery of gasoline and oil when there is not a sufficient supply of oil in the sump 50. In this connection reference is had to the electrical diagram seen in FIG. 5. In FIG. 5 lines 258 and 260 are effectively connected to a source of power in conventional fashion. The line 258 passes first to the actuating switch 244 and then to the switch 256. One side of the switch 256 is connected by the line 118 with one side of the sump switch 114, while the other side of the sump switch 114 is connected by the line 120 with the other side of the switch 256. From the switch 256 a connection is made through a line 262 to complete the electrical circuit through the motor 24.

In order to initiate operation of the present dispensing unit, it is first necessary to close the switch 244 which can be done if a conventional reset mechanism has been employed to zero the register means and providing the selector knob 202 is in one of its three definite positions. However, the circuit for energizing the motor 24 cannot be completed through the switch 114 if the level of oil in the sump 50 is below a predetermined level. In which case, the circuit for energizing the motor 24 cannot be completed unless the selector knob 202 is set in a position for dispensing gasoline alone, so that the switch 256 will be closed. Initial operation of the present dispensing unit requires that the selector knob be set for dispensing gasoline alone so that the switch 256 will be closed to complete the circuit for energizing the motor 24. After a few minutes of operation of the motor 24, the oil pump 44 which is operating at all times with the motor 24, will fill the sump 50 causing the switch 114 to close and permitting the selector knob to be moved to any position desired.

Figure 13:
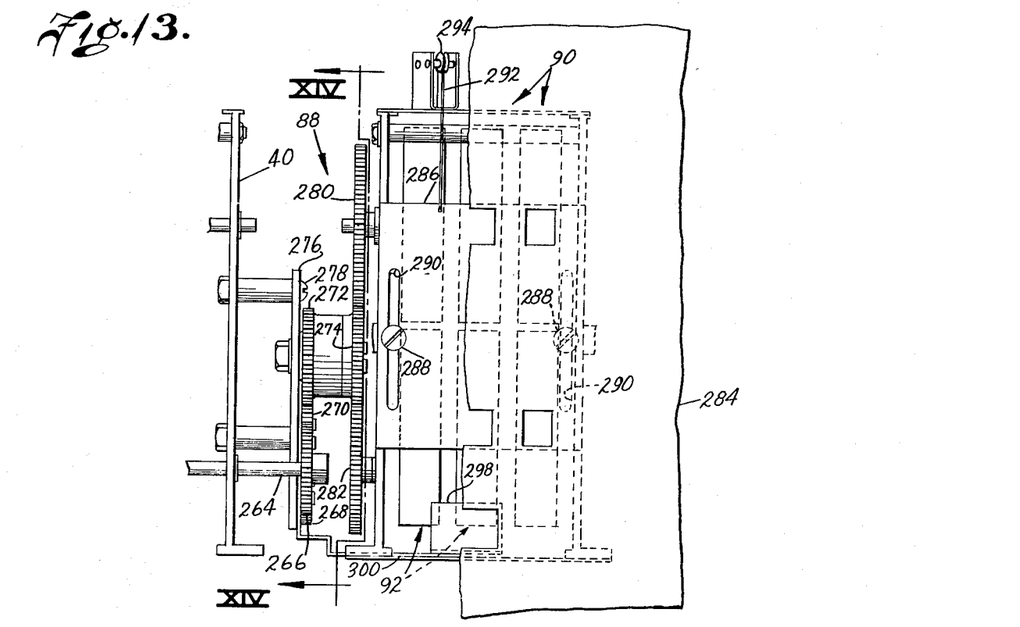
FIG. 13 is an elevation of the register for indicating the cost of oil dispensed with the gasoline.
Figure 14:
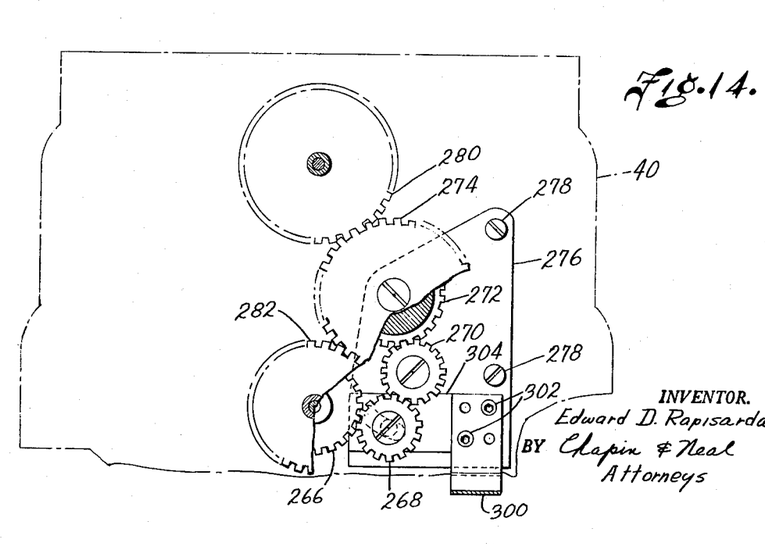
FIG. 14 is a section taken on line XIV—XIV in FIG. 13.

Referring back to FIG. 2, it will be seen, as previously described, that the usual mechanical connection is made between the gasoline meter 36 and the variator 38, and further that the usual register 40 is provided with the price and volume indicating wheels to give a visual indication of the volume and cost of gasoline delivered. The register 40 may be conventional in construction and of itself forms no part of the present invention. From the volume indicating wheels of the register 40 or the drive therefor there is a mechanical connection to the driving gears 88 for the oil register wheels 90 and 92. This drive arrangement is shown in greater detail in FIGS. 13 and 14. A shaft 264 projects from the gasoline register 40 and has a gear 266 secured to its outer end. The gear 266 meshes with idler gear 268 which in turn meshes with a second idler gear 270. The gear 270 drives a gear 272 which is integral with a gear 274. The gears 268, 270, 272 and 274 are all rotatably mounted on a bracket plate 276 which is secured to the side frame of the register 40 by screws 278. The gear 274 meshes with a gear 280 spaced thereabove and a gear 282 spaced therebelow. The gears 280, 282 are secured to driving shafts which respectively drive the register wheels 90 and 92 through conventional means wherein the right-hand register wheel of each set is the units wheel, the middle wheel is the tens wheel and the left-hand wheel is the hundreds or dollar wheel. It will next be seen that with this arrangement the register wheels 90 and 92 are at all times drivingly connected, through the register 40, with the gasoline meter 36. Thus, whenever gasoline is being delivered, the register wheels 90 and 92 will rotate. The register wheels 90 rotate at a rate reflecting the amount of oil passing through the metering pump 68 based on a given unit price of the oil; while the register wheels 92 rotate at a rate reflecting the cost of oil passing through the metering pump 70 based on this same unit price.

Preferably means are provided for rendering visually operative only the set of register wheels 90 or 92 corresponding to the metering pump 68 or 70 which is operative. It will be seen that a panel member 284 overlies the register wheels 90 and 92 and has openings therein permitting only a single number on each wheel to be visible. A shutter 286 is mounted between the panel 284 and the register wheels 90 and 92. The shutter 286 is mounted for vertical sliding movement on a pair of shoulder screws 288 passing through a pair of slots 290. A cord 292 is attached to the upper end of the shutter 286 and is trained upwardly and rearwardly around a pulley 294 and then downwardly and is secured to a pulley 296 secured to shaft 200 (FIG. 9). In the middle position of the selector knob 202 gasoline alone, as previously described, will be delivered from the dispensing unit since both of the metering pumps 68 and 70 are inoperative. Under these conditions the shutter 286 is in the position illustrated in FIG. 13 blocking visual access to both sets of register wheels 90 and 92. When it is desired to deliver a mixture of oil and gasoline, say a 20 to 1 ratio, the selector knob 202 is turned in a clockwise direction, thereby placing the pump 70 in its operative position and raising the shutter 286 to expose the register wheels 92 for visual access. Similarly, when it is desired to deliver a blend of gasoline and oil on a 25 to 1 ratio, the selector knob is moved in a counterclockwise direction approximately 180° as previously described, thereby rendering the metering pump 68 operative and lowering the shutter 286 to expose the register wheels 90. Once a delivery is complete, the gasoline register 40 must be zeroed before a subsequent delivery can be made. Interlock means for accomplishing this end are preferably provided but form no part of the present invention. Likewise, means are provided, but not herein disclosed, for zeroing the oil register wheels 90 and 92 after each delivery.

It is also desirable that means be provided for changing the rate of rotation of the wheels 90 and 92 so that oil may be sold at whatever price is desired within a fairly broad range. To this end the gear 266 (FIGS. 13 and 14) may be replaced with either a larger or smaller gear, thereby driving the register wheels at a different rate necessary to reflect a different price. It will also be noted that the idler gear 268 is mounted on a stud which projects through a slot in the bracket plate 276 so as to mesh with any alternate gear 266 of a different size. It will further be seen that a price indicating tab 298 is mounted just behind a lower opening in the panel 284 and is secured to the outer end of a long bracket 300 which in turn is secured by screws 302 to the bracket plate 276. It is also preferable that a plate 304 be secured to the bracket 300 and have an opening therein for locating the stud for gear 268 in a position wherein the gear 268 will mesh only with a gear 266 of the proper size to drive the register wheels 90 and 92 at a rate reflecting the unit price of the oil indicated on the price tab 298.

In brief summary, oil passes through the metering pumps 68, 70 whenever gasoline is being delivered since they are drivingly coupled to the gasoline meter 36. If desired a predetermined proportion of oil is delivered with the gasoline as may be controlled by the setting of the selector knob 202. In one position of the knob 202 gasoline alone will be delivered, in another position gasoline and oil (from pump 68) will be delivered at a 25:1 ratio; and in its third position gasoline and oil (from pump 70) will be delivered at a 20:1 ratio. The setting of the knob 202 will also render visually operable the oil cost wheels 90 or 92 corresponding to the metering pump 68 or 70 which is operative.

Having thus described the invention what is claimed as novel and desired to be secured by Letters Patent of the United States is:

1. A liquid dispensing unit comprising passageway forming means connected at one end to a liquid supply and having a dispensing nozzle at the other end thereof, means for pressurizing liquid in said passageway means for delivery to said nozzle and therefrom, and a meter of the positive displacement multi-piston type interposed in said passageway means for measuring the quantity of liquid flowing therethrough, in combination with second passageway forming means extending from a second source of liquid into said first passageway means adjacent said nozzle, a driving member connected to at least one piston of said meter for reciprocable movement therewith, and continuously acting means driven by said reciprocating member for passing a measured flow of the second fluid through said passageway means and into said first passageway means.

2. A liquid dispensing unit comprising passageway forming means connected at one end to a liquid supply and having a dispensing nozzle at the other end thereof, means for pressurizing liquid in said passageway means for delivery to said nozzle and therefrom, and a positive displacement meter interposed in said passageway means for measuring the quantity of liquid flowing therethrough, in combination with second passageway forming means extending from a second source of liquid into said first passageway means adjacent said nozzle, a pair of metering pumps drivingly connected to said meter, said second passageway means including branches providing separate flow paths through the respective metering pumps to said first passageway means and selective means for preventing flow of the second liquid from either or both of said metering pumps into said first passageway means whereby the first liquid may be dispensed alone or may be mixed with an additive amount of the second liquid.

3. A liquid dispensing unit as in claim 2 wherein means are provided for adjusting the capacity of each metering pump in order that an accurate percent flow through each pump may be obtained relative to the flow of the first liquid, and means are provided for attaching a seal to each metering pump in a manner preventing adjustment of the pump without breaking of the seal.

4. A liquid dispensing unit as in claim 3 wherein valve means are provided for separately diverting the flow of second liquid from each metering pump in order to enable calibration of said pumps.

5. A liquid dispensing unit comprising passageway forming means connected at one end to a liquid supply and having a dispensing nozzle at the other end thereof, means for pressurizing liquid in said passageway means for delivery to said nozzle and therefrom and a positive displacement type meter interposed in said passageway means for measuring the quantity of liquid flowing therethrough, said meter comprising a housing and a plurality of pistons, in combination with second passageway forming means extending from a second source of liquid into said first passageway means adjacent said nozzle, a pair of double acting piston type metering pumps each comprising a housing mounted on the meter housing, said second passageway means comprising branches providing parallel flow paths through said pumps, each of said metering pumps further comprising a piston rod secured to a piston of said meter, and having a piston slidably mounted thereon, said metering pump housings each having a cylindrical bore in which said pump pistons ride, an extension threaded into the end of each of said piston rods and projecting beyond the pump housing therefore, said piston rod and said extension each having shoulders confining the pump piston therebetween and limiting sliding movement of the pump piston relative to said piston rod dependent upon the extent to which the extension is threaded into the piston rod, a cap covering over said piston rod extension and preventing free access thereto, means formed on said cap and metering pump housing for attachment of sealing means which must be broken to gain access to said extensions to vary the effective capacity of said metering pumps, and selective means for preventing flow of the second fluid from either or both of said metering pumps into said first passageway means whereby the first fluid may be dispensed alone or may be mixed with an additive amount of the second fluid.

6. A liquid dispensing unit comprising passageway forming means connected at one end to a liquid supply and having a dispensing nozzle at the other end thereof, means for pressurizing liquid in said passageway means for delivery to said nozzle and therefrom and a positive displacement type meter interposed in said passageway means for measuring the quantity of liquid flowing therethrough, said meter comprising a housing and a plurality of pistons, in combination with second passageway forming means extending from a second source of liquid into said first passageway means adjacent said nozzle, a pair of double acting piston type metering pumps each comprising a housing mounted on the meter housing, said second passageway means comprising branches providing parallel flow paths through said pumps, each of said metering pumps further comprising a piston rod secured to a piston of said meter and having a piston mounted thereon, said metering pump housings each having a cylindrical bore in which the pump piston rides, said pumps having different bores to provide different capacities therefor, each of said pump housings further having bypass passageway means leading from the discharge side of the pump back to the suction side of the pump and a valve mounted in each of said pump housings and movable between a first position in which liquid discharged from the pump flows towards the first passageway means, and a second position in which liquid discharged from said pump is diverted through said bypass passageway back to the suction side of the pump, and selective means for alternately moving said pump valves between their first and second positions and for moving both pump valves to their second positions whereby the first fluid may be dispensed alone or may be mixed with an additive amount of the second fluid.

7. A liquid dispensing unit comprising passageway forming means connected at one end to a liquid supply and having a dispensing nozzle at the other end thereof, means for pressurizing liquid in said passageway means for delivery to said nozzle and therefrom and a positive displacement meter interposed in said passageway nozzle for measuring the quantity of liquid flowing therethrough, in combination with second passageway forming means extending from a second source of liquid into a first passageway means adjacent said nozzle, a pair of metering pumps drivingly connected to said meter and having different capacities, said second passageway means including branches providing parallel flow paths through said pumps, bypass passageway means extending from the discharge side of each pump to the suction side thereof, a valve associated with each of said metering pumps and movable between a first position in which liquid flows therefrom towards said first passageway means and a second position wherein flow of liquid from the metering pump is diverted through said bypass passageway means back to the suction side thereof, and selective means for alternately moving said valves between their first and second positions and moving both valves to their second positions whereby the first liquid may be dispensed alone or mixed with an additive amount of the second liquid.

8. A liquid dispensing unit comprising passageway forming means connected at one end to a liquid supply and having a dispensing nozzle at the other end thereof and means for pressurizing liquid in said passageway means for delivery to said nozzle and therefrom and a positive displacement meter interposed in said passageway means for measuring the quantity of liquid flow therethrough, in combination with second passageway forming means extending from a second source of liquid into said first passageway means adjacent said nozzle, and including a pump having its suction side connected to said second source of liquid, a sump, a line extending from the discharge side of said pump to the upper end of said sump, a float mounted in said sump, a valve controlled by the float and responsive to a rise of liquid in said sump to shut off flow of fluid from the discharge line of said pump into said sump, and a metering pump drivingly connected to said meter and disposed below said sump, said second passageway means further including a line extending from the bottom of said sump to the suction side of said metering pump whereby a continuous gravity flow of second fluid is provided to said metering pump.

9. A liquid dispensing unit comprising passageway forming means connected at one end to a liquid supply and having a dispensing nozzle at the other end thereof, means for pressurizing liquid in said passageway means for delivery to said nozzle and therefrom, and a positive displacement meter interposed in said passageway means for measuring the quantity of liquid flowing therethrough, in combination with second passageway forming means extending from a second source of liquid into said first passageway means adjacent said nozzle, and including a pump the suction side of which is connected to said second source of liquid, a sump disposed above said meter, a line extending between the discharge side of said pump and the top of said sump, a float mounted in the sump, a valve controlled by the float and responsive to a rise of the second liquid therein to prevent further flow of liquid from the discharge side of said pump into said sump, a bypass line also connected to the discharge side of said pump and extending therefrom to the second source of liquid, a pressure relief valve interposed in said bypass line, a line connecting the top of said pump with said discharge line, a pair of metering pumps drivingly connected to said meter, said second passageway means including connections between the bottom of said pump and the suction side of each of said metering pumps and selective means for preventing flow of the second liquid from either or both of said metering pumps into said first passageway means whereby the first liquid may be dispensed alone or may be mixed with an additive amount of the second liquid.

10. A liquid dispensing unit as in claim 9 wherein means are provided for rendering inoperative the first liquid pressurizing means in response to failure of the sump float to rise to a predetermined level whenever the selective means prevent flow of the second fluid from only one of said metering pumps.

11. A liquid dispensing unit comprising passageway forming means connected at one end to a liquid supply and having a dispensing nozzle at the other end thereof, means for pressurizing liquid in said passageway means for delivery to said nozzle and therefrom, a positive displacement meter interposed in said passageway means for measuring the quantity of liquid flowing therethrough, and register means for visually indicating the amount and cost of first liquid delivered from the nozzle, in combination with second passageway forming means extending from a second source of liquid into said first passageway means adjacent said nozzle, a pair of metering pumps drivingly connected to said meter, said second passageway means including branches providing separate flow paths through the respective metering pumps to said first passageway means, selective means for preventing flow of the second liquid from either or both of said metering pumps into said first passageway means whereby the first liquid may be dispensed alone or may be mixed with an additive amount of said liquid, said metering pumps having a predetermined rate of flow relative to the quantity of first liquid passing through said meter, two sets of register wheels each drivingly connected to said meter and respectively, visually indicating the cost of liquid passing through each of said metering pumps, and means for rendering inoperative the register wheels corresponding to whichever metering pump the selective means prevents flow from.

12. A liquid dispensing unit comprising passageway forming means connected at one end to a liquid supply and having a dispensing nozzle at the other end thereof, means for pressurizing liquid in said passageway means for delivery to said nozzle and therefrom, a positive displacement meter interposed in said passageway means for measuring the quantity of liquid flowing therethrough, and register means for visually indicating the amount of first liquid delivered from the nozzle, in combination with second passageway forming means extending from a second source of liquid into said first passageway means adjacent said nozzle, a pair of metering pumps drivingly connected to said meter and having different capacities, said second passageway means including branches providing separate flow paths through the respective metering pumps to said first passageway means, bypass passageway means extending from the discharge side of each pump to the suction side thereof, a bypass valve associated with each of said metering pumps and movable from a first position in which liquid flows therefrom towards said first passageway means, and a second position in which flow of liquid from the metering pump is diverted through said bypass passageway means back to the suction side thereof, selective means for alternately moving said valves between their first and second positions and moving both valves to their second positions whereby the first liquid may be dispensed alone or mixed with a desired additive amount of the second liquid, two sets of register wheels each drivingly connected at all times to said meter and each of said sets of register wheels being driven at a rate visually indicating the cost of second liquid passing respectively through each of said metering pumps, shutter means for covering over either or both of said sets of register wheels, and means for moving the shutter means to cover over whichever set of register wheels which corresponds to the metering pump having its bypass valve in said second position.

13. A liquid dispensing unit comprising passageway forming means connected at one end with a liquid supply and having a dispensing nozzle at the other end thereof, means for pressurizing liquid in said passageway means for delivery to said nozzle and therefrom, a positive displacement meter interposed in said passageway means for measuring the quantity of liquid flowing therethrough, and register means for visually indicating the amount of first liquid delivered from the nozzle, in combination with second passageway forming means extending from a second source of liquid into said first passageway means adjacent said nozzle, a pair of metering pumps drivingly connected to said meter and having different capacities, said second passageway means including branches providing separate flow paths through the respective metering pumps to said first passageway means, bypass passageway means extending from the discharge side of each pump to the suction side thereof, a bypass valve associated with each of said metering pumps and movable from a first position in which liquid flows therefrom towards said first passageway means and a second position in which flow of liquid from the metering pump is diverted through said bypass passageway means back to the suction side thereof, two sets of register wheels each drivingly connected at all times to said meter and each of said sets of register wheels being driven at a rate to visually indicate the cost of second liquid passing respectively through each of said metering pump, shutter means having a first position in which the set of wheels for one pump is covered over, a second position in which the other set of wheels is covered over, and a third position in which both sets of register wheels are covered over, and selective means including a selector knob operatively connected to said bypass valves and said shutter means and having a first position in which the one bypass valve is in its second position and the other bypass valve is in its first position, and the shutter means is in its first position, said selector knob having a second position in which the other bypass valve is in its second position and the one bypass valve is in its first position, and the shutter means is in its second position, said selector knob having a third position in which both of said bypass valves are in their second positions and said shutter means is in its third position whereby gasoline may be dispensed alone or mixed with a desired additive amount of the second liquid with the cost of the second liquid being delivered, if any, indicated by the appropriate set of register wheels.

14. A liquid dispensing unit as in claim 13 wherein the second passageway forming means include a sump disposed above the meter of the first passageway means, a pump, a line extending from the discharge side of said pump to the top of said sump, a float mounted in the sump, a switch actuated by said float as the second liquid in the sump rises to a predetermined level, and electrical circuitry means, including said switch, for rendering inoperative the pressurizing means for the first liquid whenever said float is below said predetermined level, said electric circuitry means further including a second switch which is actuated by said selector means when said knob is in its third position for bypassing said first switch and rendering said pressurizing means operative.

15. A liquid dispensing unit as in claim 13 wherein means are provided for actuating the first liquid pressurizing means, an interlock member is connected to said selector knob and a member cooperative therewith is operatively connected to said actuating means, said interlock member having three operative portions corresponding to the three positions of the selector knob wherein the selector knob is prevented from movement by the cooperative member when the pressurizing means are actuated, said interlock member preventing movement of said cooperative member for actuation of said pressurizing means when said selector knob is not in one of said three positions.

16. A liquid dispensing unit comprising passageway forming means connected at one end with a liquid supply and having a dispensing nozzle at the other end thereof, means for pressurizing liquid in said passageway means for delivery to said nozzle and therefrom, means including a lever for actuating said pressurizing means, a positive displacement meter interposed in said passageway means for measuring the quantity of liquid flowing therethrough, in combination with second passageway forming means extending from a second source of liquid into said first passageway means adjacent said nozzle, a pair of metering pumps drivingly connected to said meter and having different capacities, said second passageway means including branches providing separate flow paths through the respective metering pumps to said first passageway means, bypass passageway means extending from the discharge side of each pump to the suction side thereof, a bypass valve associated with each of said metering pumps and movable from a first position in which liquid flows therefrom towards said first passageway means, and a second position in which flow of liquid from the metering pump is diverted through said bypass passageway means back to the suction side thereof, selective means including a selector knob, a rotatable shaft to which said knob is secured, linkage means connecting said shaft and said valves for one valve to be in its first position and the other valve in its second position when the selector knob is in its first position, and for the other valve to be in its first position and said one valve in its second position when the selector knob is in its second position, and for both valves to be in their second positions when the selector knob is in its third position, an interlock member secured to said shaft and having three slots therein corresponding to the three positions of said selector knob, and a cooperative lever operatively connected to said operating lever to be disposed in one of said slots when the pressurizing means is actuated thereby preventing rotation of said selector knob as liquid is being dispensed, said interlock member preventing movement of said cooperative lever and actuation of said pressurizing means when said selector knob is not in one of its three positions.

17. A liquid dispensing unit comprising passageway forming means connected at one end to a liquid supply and having a dispensing nozzle at the other end thereof, means for pressurizing liquid in said passageway means for delivery to said nozzle and therefrom, a positive displacement meter interposed in said passageway means for measuring the quantity of liquid flowing therethrough, in combination with second passageway forming means extending from a second source of liquid into said first passageway means adjacent said nozzle, a pair of metering pumps drivingly connected to said meter and having different capacities, said second passageway means including branches providing separate flow paths through the respective metering pumps to said first passageway means, bypass passageway means extending from the discharge side of each pump to the suction side thereof, a bypass valve associated with each of said metering pumps and movable from a first position in which liquid flows therefrom towards said first passageway means, and a second position in which flow of liquid from the metering pump is diverted through said bypass passageway means back to the suction side thereof, selective means including a knob, a rotatable shaft to which said knob is secured and linkage means connecting said shafts and said valves for one valve to be in its first position and another valve in its second position when the selector knob is in its first position, and for the other valve to be in its first position and said one valve in its second position when the selector knob is rotated to its second position, and for both valves to be in their second positions when the selector knob is in its third position.

18. A liquid dispensing unit comprising passageway forming means connected at one end to a liquid supply and having a dispensing nozzle at the other end thereof, means for pressurizing liquid in said passageway means for delivery to said nozzle and therefrom, means for actuating said pressurizing means, and a positive displacement meter interposed in said passageway means for measuring the quantity of liquid flow therethrough, in combination with second passageway forming means extending from a second source of liquid into said first passageway means adjacent said nozzle, a pair of metering pumps drivingly connected to said meter, said second passageway means including branches providing separate flow paths through the respective metering pumps to said first passageway means, selective means movable to a plurality of definite positions for preventing flow of the second liquid from either or both of said metering pumps into said first passageway means whereby the first liquid may be dispensed alone or may be mixed with an additive amount of the second liquid, and means connected to said pressure actuating means for preventing operation of said selective means once the pressurizing means are actuated, and means preventing operation of said actuating means unless said selective means are set in one of its definite operating positions.

References Cited in the file of this patent
UNITED STATES PATENTS

| | | |
|---|---|---|
| 2,415,835 | Moore et al. | Feb. 18, 1947 |
| 2,743,843 | Bliss | May 1, 1956 |
| 2,810,495 | Carriol et al. | Oct. 22, 1957 |
| 2,829,800 | Kirchhoff | Apr. 8, 1958 |
| 2,898,002 | Blanchet et al. | Aug. 4, 1959 |